(12) United States Patent
Jeon

(10) Patent No.: US 10,613,920 B2
(45) Date of Patent: Apr. 7, 2020

(54) APPARATUS FOR CONTROLLING INVERTER

(71) Applicant: LSIS CO., LTD., Anyang-si, Gyeonggi-do (KR)

(72) Inventor: Jong-Wook Jeon, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 197 days.

(21) Appl. No.: 15/386,250

(22) Filed: Dec. 21, 2016

(65) Prior Publication Data

US 2017/0308426 A1 Oct. 26, 2017

(30) Foreign Application Priority Data

Apr. 25, 2016 (KR) ........................ 10-2016-0050353

(51) Int. Cl.
| | |
|---|---|
| *G05B 15/02* | (2006.01) |
| *H02J 13/00* | (2006.01) |
| *H02J 3/00* | (2006.01) |
| *G06F 11/07* | (2006.01) |
| *H02P 27/00* | (2006.01) |
| *H02M 7/00* | (2006.01) |
| *H02M 7/44* | (2006.01) |

(52) U.S. Cl.
CPC .......... *G06F 11/0787* (2013.01); *G05B 15/02* (2013.01); *G06F 11/0736* (2013.01); *G06F 11/0751* (2013.01); *H02M 7/00* (2013.01); *H02M 7/44* (2013.01); *H02P 27/00* (2013.01)

(58) Field of Classification Search
CPC ............. G06F 11/0787; G06F 11/0751; G06F 11/0736; H02M 7/00; H02M 7/44; H02P 27/00; G05B 15/02

USPC ........................................................ 700/292
See application file for complete search history.

(56) References Cited

U.S. PATENT DOCUMENTS

| | | | | |
|---|---|---|---|---|
| 2004/0073404 A1* | 4/2004 | Brooks | ................ | G05B 19/409 702/183 |
| 2006/0075292 A1* | 4/2006 | Fukui | .................. | G06F 11/0727 714/5.11 |
| 2010/0106339 A1* | 4/2010 | Little | ..................... | G01D 9/005 700/293 |

(Continued)

FOREIGN PATENT DOCUMENTS

| | | |
|---|---|---|
| JP | 2002300785 A | 10/2002 |
| JP | 3581858 B2 | 8/2004 |

(Continued)

OTHER PUBLICATIONS

Japanese Notice of Allowance for related Japanese Application No. 2016-242653; report dated Jan. 23, 2018; (3 pages).

(Continued)

*Primary Examiner* — Ziaul Karim
(74) *Attorney, Agent, or Firm* — K&L Gates LLP

(57) ABSTRACT

An apparatus for controlling an inverter includes a volatile, first storage part; a nonvolatile, second storage part; and a control part configured to store data related to the status of the inverter in the first storage part when the inverter is driven and configured to select some of the data stored in the first storage part depending on the type of failure event when a failure event occurs and store the selected data in the second storage part.

5 Claims, 4 Drawing Sheets

(56) References Cited

U.S. PATENT DOCUMENTS

| | | | |
|---|---|---|---|
| 2012/0296482 A1* | 11/2012 | Steven | G06Q 50/06 700/291 |
| 2013/0154536 A1 | 6/2013 | Park | |
| 2014/0188315 A1 | 7/2014 | Kang et al. | |
| 2015/0323608 A1 | 11/2015 | Jung | |

FOREIGN PATENT DOCUMENTS

| JP | 2007135325 A | | 5/2007 |
|---|---|---|---|
| JP | 2007306758 A | | 11/2007 |
| JP | 2014204655 | | 10/2014 |
| JP | 2014204655 A | * | 10/2014 |
| JP | 2015-23791 A | | 2/2015 |
| JP | 2015027138 A | | 2/2015 |
| KR | 10-0564206 B1 | | 6/2006 |
| KR | 10-0964035 B1 | | 6/2010 |

OTHER PUBLICATIONS

European Search Report dated Jul. 7, 2017 in corresponding European Patent Application No. 16203770.9.
Japanese Office Action Appl. No. 2016-242653 dated Oct. 3, 2017—3 pages.

* cited by examiner

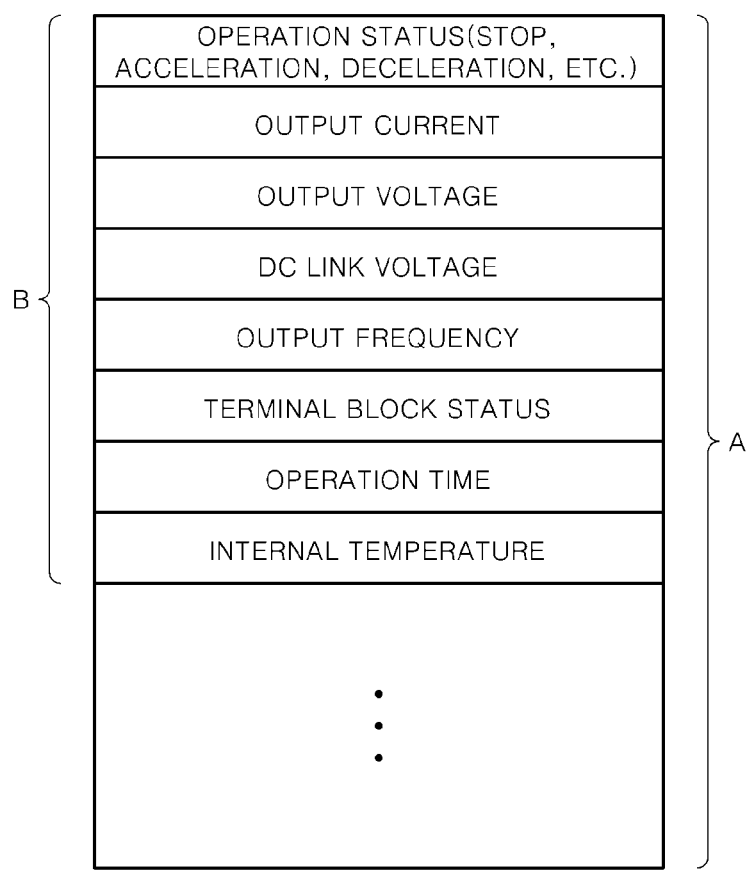

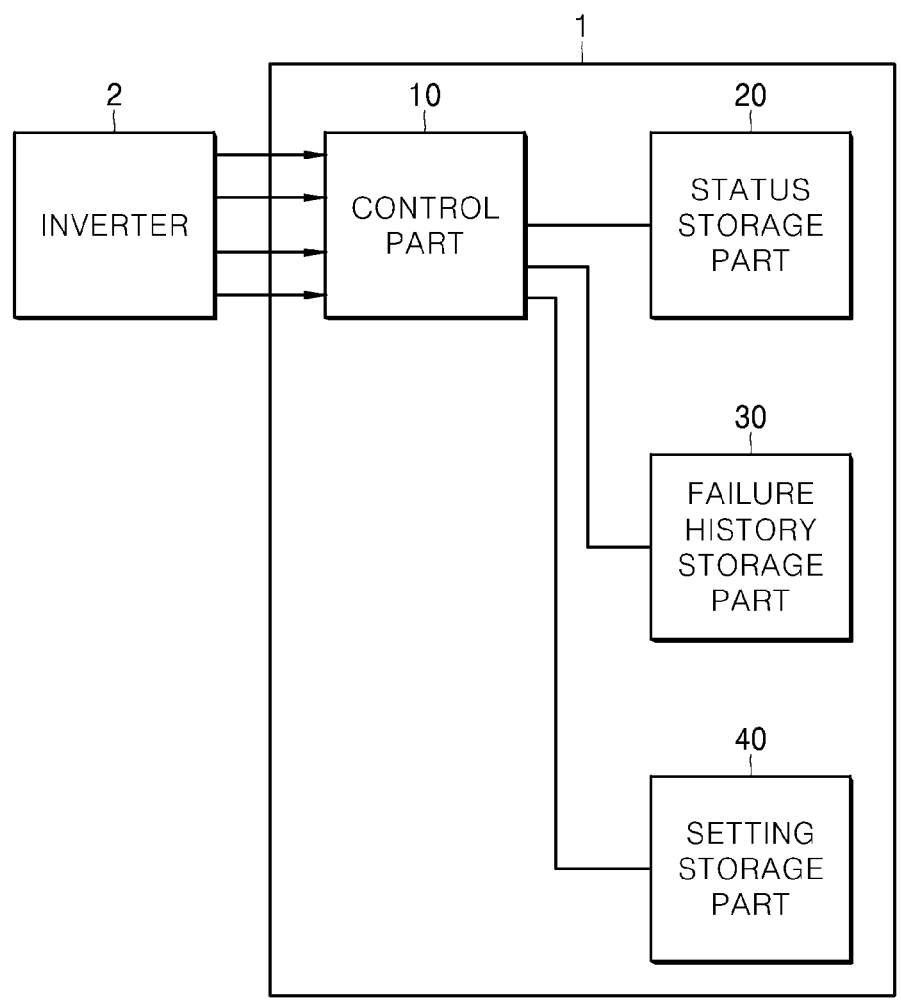

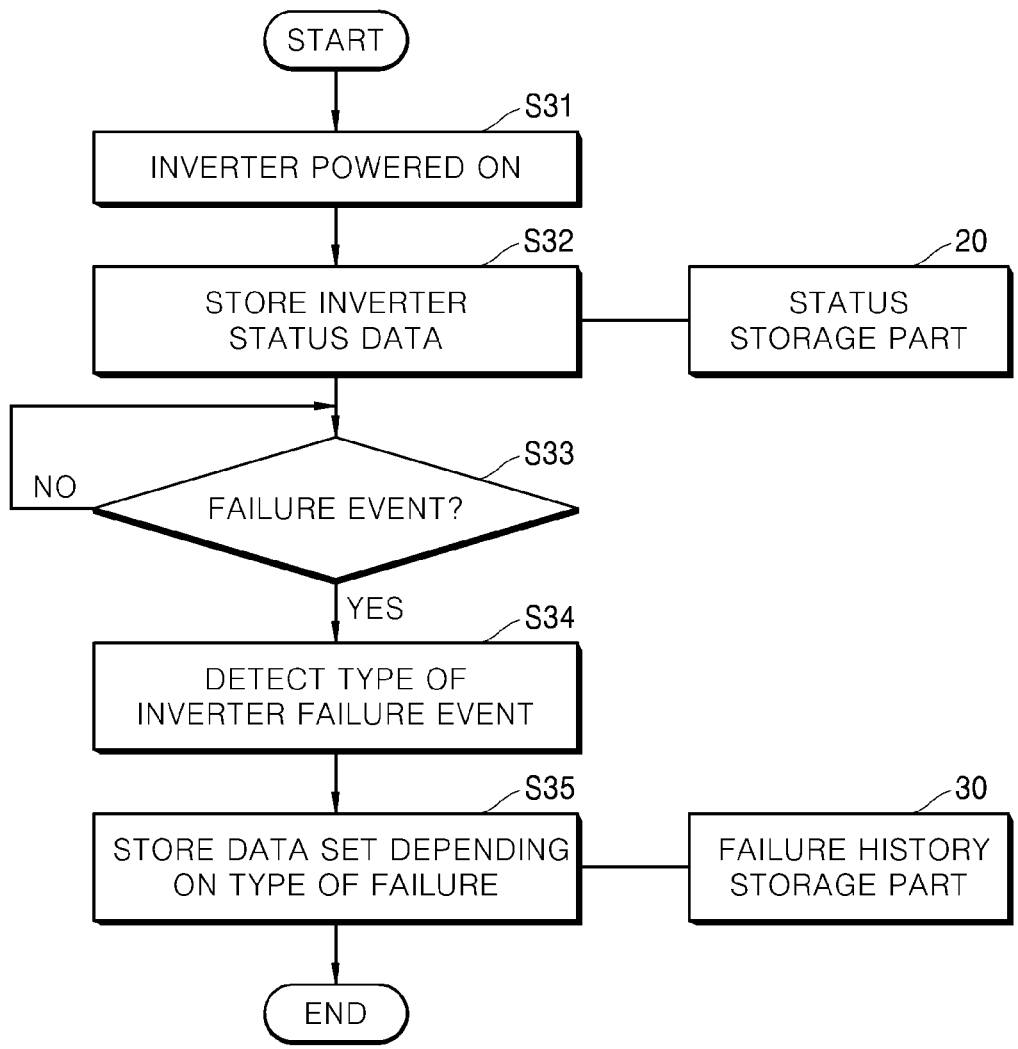

[FIG. 4]
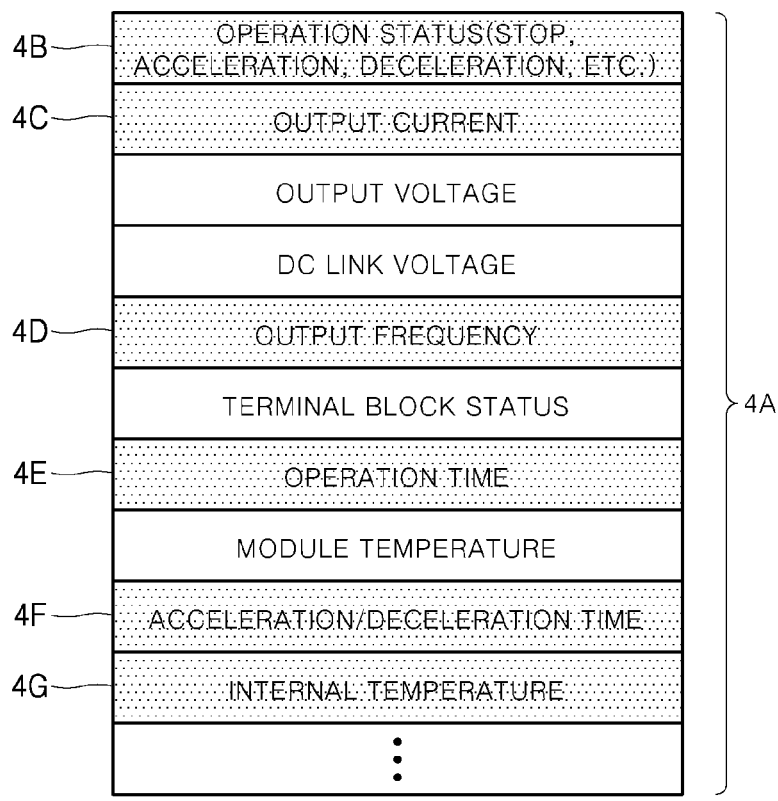

APPARATUS FOR CONTROLLING INVERTER

CROSS REFERENCE TO RELATED APPLICATION

This application claims the benefit of Korean Patent Application No. 10-2016-0050353, filed on Apr. 25, 2016, entitled "APPARATUS FOR CONTROLLING INVERTER", which is hereby incorporated by reference in its entirety into this application.

BACKGROUND

1. Technical Field

The present invention relates to an apparatus for controlling an inverter.

2. Description of the Related Art

In general, an inverter refers to a power converting device which receives commercial AC power and drives a motor by applying a suitable AC voltage to the motor.

When the inverter is powered on, a control part of the inverter consistently stores data related to the status of the inverter. At this time, the control part temporarily stores the inverter status data to be stored in the event of failure, and then stores the inverter status data in a failure history storage part in the event of failure.

However, due to a limitation in memory of the failure history storage part, it is difficult to store all of the inverter status data in the event of failure.

FIG. 1 is a view used to explain data related to the overall inverter status stored in an inverter storage part and data related to the inverter status stored in a failure history storage part in the event of failure.

As shown in FIG. 1, the overall inverter status data A are stored in a temporary storage part and some data B are stored in a failure history storage part in the event of failure. In this case, the type of data stored in the failure history storage part is preset by a user. Some data B stored in the failure history storage part in this manner are provided to an upper level control part in order to diagnose the cause of the failure.

A failure of an inverter may vary depending on the status of input power of the inverter, the status of a motor, an ambient temperature, etc. That is, the inverter status data required to diagnose the cause of failure in the event of certain failure are very diverse.

However, when only the inverter status data preset in the event of failure are stored as conventional, there is a problem of a limitation in failure diagnosis.

SUMMARY

It is an aspect of the present invention to provide an apparatus for controlling an inverter, which is capable of selecting and storing data related to the status of the inverter depending on the type of failure and the load status when an inverter failure event occurs.

In accordance with one aspect of the present invention, there is provided an apparatus for controlling an inverter, including: a volatile, first storage part; a nonvolatile, second storage part; and a control part configured to store data related to the status of the inverter in the first storage part when the inverter is driven and configured to select some of the data stored in the first storage part depending on the type of failure event when a failure event occurs and store the selected data in the second storage part.

In one embodiment, the apparatus may further include a third storage part configured to store the type of data related to the inverter status to be stored in the second storage part, depending on the type of failure event.

In one embodiment, the third storage part may store an address in the first storage part of the data related to the inverter status to be stored in the second storage part, depending on the type of failure event.

In one embodiment, the control part may determine the type of failure event when the failure event occurs, and select the data stored in the first storage part by referring to the type of data selected depending on the type of failure event stored in the third storage part.

In one embodiment, the data related to the inverter status may include data related to the operation status, the load status and inverter use environments.

In one embodiment, when the failure event is an overcurrent, the control part may select data related to an output voltage, a DC link voltage and a terminal block status from the data stored in the first storage part and may store the selected data in the second storage part.

In one embodiment, when the failure event is an overvoltage, the control part may select data related to an output current and an output frequency from the data stored in the first storage part and may store the selected data in the second storage part.

In one embodiment, when the failure event is an emergency stop, the control part may select data related to terminal block information and input/output part information from the data stored in the first storage part and may store the selected data in the second storage part.

According to the present invention, it is possible to make a correct diagnosis for failure by selecting data related to the inverter status depending on the types of failure events which occur in the inverter and storing the selected data in the failure history storage part.

BRIEF DESCRIPTION OF DRAWINGS

FIG. 1 is a view used to explain data related to the overall inverter status stored in an inverter storage part and data related to the inverter status stored in a failure history storage part in the event of failure.

FIG. 2 is a view showing a configuration example of an inverter controller according to one embodiment of the present invention.

FIG. 3 is a flow chart for explaining an inverter control method of a control part according to one embodiment of the present invention.

FIG. 4 is a view used to explain data stored in a failure history storage part according to one embodiment of the present invention.

DETAILED DESCRIPTION

The present invention may be modified in various ways and may include a variety of embodiments. It should be, however, understood that the present invention is not limited to the following embodiments, and that the embodiments are provided for illustrative purposes only. The scope of the invention should be defined only by the accompanying claims and equivalents thereof.

Hereinafter, preferred embodiments of the present invention will be described in detail with reference to the accompanying drawings.

FIG. 2 is a view showing a configuration example of an inverter controller according to one embodiment of the present invention.

Referring to FIG. 2, an inverter controller 1 according to one embodiment of the present invention may include a control part 10, a status storage part 20, a failure history storage part 30 and a setting storage part 40. The control part 10 may receive data related to the inverter status from an inverter 2.

Although it is shown in the figure that the controller 1 of the present invention is separated from the inverter 2 for the sake of convenience, the controller 2 may be built in the inverter 2. The control part 10 controls the overall operation of the inverter 2 and may be a CPU (Central Processing Unit) of the inverter 2.

The inverter 2 is provided to drive a motor (not shown) under control of the control part 10. When the inverter 2 is powered on, the control part 10 can control the operation of the inverter 2. In operation of the inverter 2, the control part 10 can store data related to the operation status, the load status and inverter use environments in the status storage unit 30.

For example, data related to the operation status may include stop, acceleration, deceleration, etc. Data related to the load status may include an output current, an output voltage, a DC link voltage, an output frequency, terminal block status, operation time, module temperature, acceleration/deceleration time, internal temperature, etc. Data related to inverter use environments may include external temperature of the inverter. However, these data are just illustrative. It is obvious to those skilled in the art that the data related to the operation status and the load status may be configured in a more diverse manner.

The status storage part 20 may be a volatile memory from which stored data are erased when the inverter 2 is powered off. For example, the status storage part 20 may be configured to include a random access memory (RAM), a dynamic RAM (DRAM), a static RAM (SRAM) or the like. However, this is just illustrative and the present invention is not limited thereto. It is to be understood that various different volatile memories may be used as the status storage part 20.

The failure history storage part 30 may be a nonvolatile memory holding stored data when the inverter 2 is powered off. For example, the failure history storage part 30 may be configured to include an electrically erasable programmable read-only memory (EEPROM), a flash memory, a ferroelectric RAM (FRAM) or the like. The present invention is not limited thereto. It is to be understood that various different nonvolatile memories may be used as the failure history storage part 30.

The setting storage part 40 may store the type of data stored in the failure history storage part 30 in the event of failure in association with failure events. A user can set inverter-related data to be stored in the vent of failure through a human-machine interface (HMI). To this end, an HMI (not shown) may offer a menu related to setting of failure history data to the user.

Alternatively, the type of data stored in the failure history storage part 30 in the event of failure may be received from an upper level control part (not shown) through a network and may be stored in the setting storage part 40 by the control part 10. As another alternative, the data type may be set in advance and stored in the failure history storage part 30 at the time of manufacture of the inverter 2. In this manner, the data type stored in the setting storage part 40 and the failure history storage part 30 in the event of failure may be set in various different ways.

In addition, although the setting storage part 40 may directly select data stored in the failure history storage part 30 in the event of failure, the setting storage part 40 can select a memory address of data stored in the status storage part 20. The data stored in the status storage part 20 are set in advance at the time of manufacture of the inverter 2 and may have addresses set in advance in the status storage part 20. In this case, instead of directly selecting data, a user may select an address of the data in the status storage part 20 and store the data of the corresponding address in the failure history storage part 30.

According to one embodiment of the present invention, in operation of the inverter 2, the control part 10 may store the status related to the inverter 2 in the status storage part 20 periodically or in real time. In the event of failure, depending on the operation status of the inverter 2 and the type of failure events at that time, the control part 10 may select some of data related to the inverter status stored in the status storage part 20 and store the selected data in the failure history storage part 30, as will be described below with reference to the drawings.

FIG. 3 is a flow chart for explaining an inverter control method of the control part 10 according to one embodiment of the present invention.

Referring to the flow chart of FIG. 3, when the inverter 2 is powered on (S31), the control part 10 of one embodiment of the present invention drives the inverter 2. When the inverter 2 is driven, the control part 10 stores data related to the status of the inverter 2 in the status storage part 20 (S32).

The data related to the status of the inverter 2 may include data related to the operation status, the load status and inverter use environments, which can be delivered to the control part 10 from detection devices such as internal and external sensors of the inverter 2.

For example, data related to the operation status may include stop, acceleration, deceleration, etc. Data related to the load status may include an output current, an output voltage, a DC link voltage, an output frequency, terminal block status, operation time, module temperature, acceleration/deceleration time, internal temperature, etc. Data related to inverter use environments may include external temperature of the inverter. However, as described above, these data are just illustrative and it is obvious to those skilled in the art that the data related to the operation status and the load status may be configured in a more diverse manner.

In this manner, the control part 10 can store the data related to the status of the inverter 2 in the status storage part 20 periodically or when a specific event (except a failure event) occurs.

When a failure event occurs (S33), the control part 10 detects the type of failure event of the inverter 2 (S34). Then, the control part 10 selects some of the data related to the inverter status stored in the status storage part 20 depending on the type of failure event and store the selected data in the failure history storage part 30 (S35). The control part 10 may determine data to be selected by referring to the type of data which are stored in the setting storage part 40 and set depending on the type of failure event.

FIG. 4 is a view used to explain data stored in the failure history storage part 30 according to one embodiment of the present invention.

Referring to FIG. 4, in a case where data 4A related to the overall inverter status are stored in the status storage part 20 under control of the control part 10, when a failure event occurs, the control part 10 may select some 4B to 4G, which are set depending on the type of failure event, from the data 4A stored in the status storage part 20 and store the selected data 4B to 4G in the failure history storage part 30. In this case, the control part 10 may determine data to be selected by referring to the type of data which are stored in the setting storage part 40 and selected depending on the type of failure event.

As one example, if the type of failure event is an overcurrent (OC), the control part 10 may select data related to an output voltage, a DC link voltage and a terminal block status from the status data stored in the status storage part 20 and store the selected data in the failure history storage part 30.

As another example, if the type of failure event is an overvoltage (OV), the control part 10 may select data related to an output current and an output frequency from the status data stored in the status storage part 20 and store the selected data in the failure history storage part 30.

As a further example, if the type of failure event is an emergency stop, the control part 10 may select data related to terminal block information and input/output part (I/O) information from the status data stored in the status storage part 20 and store the selected data in the failure history storage part 30.

However, these data are just illustrative and the present invention is not limited thereto. The control part 10 of the present invention may select data stored in the status storage part 20 depending on more diverse types of failure events and store the selected data in the failure history storage part 30. In this case, the control part 10 may determine data to be selected by referring to the type of data which are stored in the setting storage part 40 and set depending on the types of failure events.

Although not shown, the control part 10 which selects and stores data in the failure history storage part 30 depending on the type of failure event in this manner may stop the operation of the inverter 2 and provide failure-related status data stored in the failure history storage part 30 to the upper level control part (not shown) via a wired or wireless network.

According to the present invention, it is possible to make a correct diagnosis for failure by selecting data related to the inverter status depending on the types of failure events which occur in the inverter and storing the selected data in the failure history storage part.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. An apparatus for controlling an inverter, comprising: a volatile, first storage part; a nonvolatile, second storage part; a third storage part separate from and independent of the first storage part and the second storage part, wherein the third storage part is configured to store a type of data related to an inverter status to be stored in the second storage part depending on a type of failure event; and a control part configured to store data related to the inverter status in the first storage part when the inverter is driven and configured to select some of the data stored in the first storage part when the failure event occurs and store the selected data in the second storage part depending on the type of failure event and the stored type of data related to the inverter status, wherein the control part is configured to determine the type of failure event when the failure event occurs, and select the data stored in the first storage part by referring to the type of data selected depending on the type of failure event stored in the third storage part, wherein, when the failure event is an overvoltage, the control part is configured to select data related to an output current and an output frequency from the data stored in the first storage part and store the selected data in the second storage part, and wherein the control part is further configured to make a failure diagnosis based on the selected data stored in the second storage part.

2. The apparatus according to claim 1, wherein the third storage part stores an address in the first storage part of the data related to the inverter status to be stored in the second storage part, depending on the type of failure event.

3. The apparatus according to claim 1, wherein the data related to the inverter status include data related to the operation status, the load status and inverter use environments.

4. The apparatus according to claim 1, wherein, when the failure event is an overcurrent, the control part selects data related to an output voltage, a DC link voltage and a terminal block status from the data stored in the first storage part and stores the selected data in the second storage part.

5. An apparatus for controlling an inverter, comprising: a volatile, first storage part; a nonvolatile, second storage part; a third storage part separate from and independent of the first storage part and the second storage part, wherein the third storage part is configured to store a type of data related to an inverter status to be stored in the second storage part depending on a type of failure event; and a control part configured to store data related to the inverter status in the first storage part when the inverter is driven and configured to select some of the data stored in the first storage part when the failure event occurs and store the selected data in the second storage part depending on the type of failure event and the stored type of data related to the inverter status, wherein the control part is configured to determine the type of failure event when the failure event occurs, and select the data stored in the first storage part by referring to the type of data selected depending on the type of failure event stored in the third storage part, wherein, when the failure event is an emergency stop, the control part is configured to select data related to terminal block information and input/output part information from the data stored in the first storage part and store the selected data in the second storage part, and wherein the control part is further configured to make a failure diagnosis based on the selected data stored in the second storage part.

* * * * *